US012746738B2

(12) United States Patent
Tokuda et al.

(10) Patent No.: US 12,746,738 B2
(45) **Date of Patent: *Sep. 29, 2026**

(54) LAMINATE

(71) Applicant: TOYOBO CO., LTD., Osaka (JP)

(72) Inventors: Kaya Tokuda, Otsu (JP); Tetsuo Okuyama, Otsu (JP); Keisuke Matsuo, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/571,852

(22) PCT Filed: Jul. 22, 2022

(86) PCT No.: PCT/JP2022/028489
§ 371 (c)(1),
(2) Date: Dec. 19, 2023

(87) PCT Pub. No.: WO2023/032521
PCT Pub. Date: Mar. 9, 2023

(65) Prior Publication Data
US 2024/0336033 A1 Oct. 10, 2024

(30) Foreign Application Priority Data
Sep. 2, 2021 (JP) ................................ 2021-143097

(51) Int. Cl.
*B32B 15/08* (2006.01)
*B32B 7/12* (2006.01)
(Continued)

(52) U.S. Cl.
CPC ................ *B32B 15/08* (2013.01); *B32B 7/12* (2013.01); *B32B 15/18* (2013.01); *B32B 15/20* (2013.01);
(Continued)

(58) Field of Classification Search
CPC ........... B32B 15/08; B32B 7/12; B32B 15/18; B32B 15/20; B32B 27/281;
(Continued)

(56) References Cited

U.S. PATENT DOCUMENTS

2009/0178760 A1 7/2009 Nakajima et al.
2010/0233476 A1* 9/2010 Uchida .............. C08G 73/1064 524/592
(Continued)

FOREIGN PATENT DOCUMENTS

JP H11-121148 A 4/1999
JP 2006147662 A * 6/2006
(Continued)

OTHER PUBLICATIONS

The International Bureau of WIPO, International Preliminary Report on Patentability in International Patent Application No. PCT/JP2022/028489 (Mar. 5, 2024).
(Continued)

*Primary Examiner* — John D Freeman
(74) *Attorney, Agent, or Firm* — Leydig, Voit & Mayer, Ltd.

(57) ABSTRACT

Provided is a laminate that has excellent long-term heat resistance even when an inorganic substrate having a high surface roughness is used. This laminate is characterized by having an inorganic substrate, a silane coupling agent layer, and a heat-resistant polymer film in this order, and satisfying the following (A)-(C). (A) The peel strength F0 of the laminate, as measured by a 90° peeling method, is 1.0-20 N/cm. (B) In the surface of the inorganic substrate after peeling the heat-resistant polymer film from the laminate at 90°, the area of a peeled portion on the boundary surface between the inorganic substrate and the silane coupling agent layer is at most 20% of the entire peeled surface. (C)
(Continued)

The peel strength F1 of the laminate, as measured by the 90° peeling method after heating in a nitrogen atmosphere at 350° C. for 500 hours, is greater than F0.

17 Claims, 4 Drawing Sheets

(51) Int. Cl.
*B32B 15/18* (2006.01)
*B32B 15/20* (2006.01)
*B32B 27/28* (2006.01)
*B32B 37/10* (2006.01)
*C08J 5/12* (2006.01)

(52) U.S. Cl.
CPC ............ *B32B 27/281* (2013.01); *B32B 37/10* (2013.01); *C08J 5/12* (2013.01); *B32B 2307/306* (2013.01); *B32B 2379/08* (2013.01); *B32B 2457/12* (2013.01)

(58) Field of Classification Search
CPC ............ B32B 2250/02; B32B 2255/06; B32B 2255/10; B32B 2255/26; B32B 2307/306; B32B 2307/538; B32B 2307/748; B32B 37/10; B32B 2379/08; B32B 2457/12; B32B 9/045; B32B 15/082; B32B 15/09; B32B 9/00; B32B 15/088; B32B 27/08; B32B 27/283; B32B 27/34; B32B 27/36; B32B 37/12; C08J 5/12; C08J 5/18; Y02E 10/50
See application file for complete search history.

(56) References Cited

U.S. PATENT DOCUMENTS

2011/0088933 A1* 4/2011 Amou .................... H05K 3/385 174/257
2013/0310486 A1* 11/2013 Kawakusu ........... C08G 18/346 523/451
2017/0225433 A1 8/2017 Okuyama et al.
2019/0134963 A1 5/2019 Hara et al.
2021/0122143 A1 4/2021 Yamashita et al.

FOREIGN PATENT DOCUMENTS

JP 2006-231134 A 9/2006
JP 2007-101496 A 4/2007
JP 2007-101497 A 4/2007
JP 2007-155913 A 6/2007
JP 2009-117192 A 5/2009
JP 2011-063760 A 3/2011
JP 2015-013474 A 1/2015
JP 2015-178237 A 10/2015
JP 2016107593 A * 6/2016
JP 2017-126728 A 7/2017
JP 2018-126922 A 8/2018
JP 2019-119126 A 7/2019
JP 2020-059169 A 4/2020
JP 2020-059226 A 4/2020
JP 6721041 B2 7/2020
JP 2020-136600 A 8/2020
WO WO 2016/031746 A1 3/2016
WO WO 2018/221374 A1 12/2018

OTHER PUBLICATIONS

Japan Patent Office, Office Action in Japanese Patent Application No. 2023-545158 (Dec. 24, 2024).
Japan Patent Office, International Search Report in International Patent Application No. PCT/JP2022/028489 (Oct. 11, 2022).
Japan Patent Office, Office Action in Japanese Patent Application No. 2023-545158 (Jul. 31, 2025).
China National Intellectual Property Administration, Office Action in Chinese Patent Application No. 202280057318.6 (Aug. 12, 2025).
China National Intellectual Property Administration, Office Action in Chinese Patent Application No. 202280057318.6 (Dec. 8, 2025).

* cited by examiner

LAMINATE

TECHNICAL FIELD

The present invention relates to a laminate. More specifically, the present invention relates to a laminate in which a heat-resistant polymer film, an adhesive layer, and an inorganic substrate are laminated in this order.

BACKGROUND ART

In recent years, for the purpose of decreasing the weight, size, and thickness of and imparting flexibility to functional elements such as semiconductor elements, MEMS elements, and display elements, technological development for forming these elements on polymer films has been actively carried out. In other words, as materials for substrates of electronic parts such as information and communication equipment (broadcasting equipment, mobile radio, portable communication equipment, and the like), radar, and high-speed information processing equipment, ceramics which exhibit heat resistance and can cope with increases in frequencies (reaching the GHz band) of the signal band of information and communication equipment have been conventionally used. However, ceramics are not flexible and are also hardly thinned and thus have a drawback that the applicable fields are limited, and polymer films have recently been used as substrates.

As a method for manufacturing a laminate in which a functional element is formed on the polymer film, (1) a method in which a metal layer is laminated on a resin film with an adhesive or a pressure sensitive adhesive interposed therebetween (Patent Documents 1 to 3), (2) a method in which a metal layer is placed on a resin film and then heat and pressure are applied for lamination (Patent Document 4), (3) a method in which a polymer film or metal layer is coated with a varnish for resin film formation, drying is performed, and then a metal layer or polymer film is laminated thereon, (4) a method in which a resin powder for resin film formation is disposed on a metal layer and compression molding is performed, (5) a method in which a conductive material is formed on a resin film by screen printing or sputtering (Patent Document 5), and the like are known. In a case where a multilayer laminate having three or more layers is manufactured, various combinations of the above-mentioned methods and the like are adopted.

Meanwhile, in the process of forming the laminate, the laminate is often exposed to high temperatures. For example, heating at about 450° C. may be required for dehydrogenation in the fabrication of low-temperature polysilicon thin film transistors, and a temperature of about 200° C. to 300° C. may be applied to the film in the fabrication of a hydrogenated amorphous silicon thin film. Hence, the polymer film composing the laminate is required to exhibit heat resistance, but as a practical matter, polymer films which can withstand practical use in such a high temperature region are limited. In addition, it is generally conceivable to use a pressure sensitive adhesive or an adhesive to bond a polymer film to a metal layer, but heat resistance is also required for the joint surface (namely, the adhesive or pressure sensitive adhesive for bonding) between the polymer film and the metal layer at that time. However, conventional adhesives and pressure sensitive adhesives for bonding do not exhibit sufficient heat resistance and cannot be applied since problems such as peeling off (that is, decreases in peel strength) of the polymer film, blistering, and carbide formation occur during the process or during actual use. In particular, in a case of being exposed to high temperatures for a long period of time or used at high temperatures for a long period of time, there is a problem that the peel strength decreases significantly and the laminate is unusable as a product.

In view of these circumstances, a laminate in which a polyimide film or a polyphenylene ether layer which exhibits excellent heat resistance, is tough, and can be thinned is bonded to an inorganic substance layer containing a metal with a silane coupling agent interposed therebetween has been proposed as a laminate of a polymer film and a metal layer (for example, see Patent Documents 6 to 9).

PRIOR ART DOCUMENT

Patent Documents

Patent Document 1: JP-A-2020-136600
Patent Document 2: JP-A-2007-101496
Patent Document 3: JP-A-2007-101497
Patent Document 4: JP-A-2009-117192
Patent Document 5: JP-A-11-121148
Patent Document 6: JP-A-2019-119126
Patent Document 7: JP-A-2020-59169
Patent Document 8: JP-B-6721041
Patent Document 9: JP-A-2015-13474

SUMMARY OF THE INVENTION

Problems to be Solved by the Invention

However, it has been found that since the silane coupling agent coating layer obtained by the methods disclosed in Patent Documents 6 to 8 is extremely thin, the close contact force (peel strength) that can withstand practical use is not exerted in a metal layer having an arithmetic surface roughness (Ra) of greater than 0.05 μm, and metal layers to which the silane coupling agent coating layer is applicable are limited to metal layers having a small surface roughness. In particular, it has been found that in a case where a polyimide film and a metal layer are laminated with a silane coupling agent interposed therebetween, the polymer does not soften or flow into the metal layer surface under usual heating and pressure pressing conditions, thus an anchor effect near the metal layer surface cannot be expected, and close contact force is not exerted.

In the method disclosed in Patent Document 9, polyphenylene ether is used as the heat-resistant polymer resin layer, but polyphenylene ether exhibits poor heat resistance (soldering heat resistance: 260° C. to 280° C. and long-term heat resistance) and cannot withstand practical use.

The present invention has been made in view of the above-mentioned problems, and an object thereof is to provide a laminate that exhibits excellent long-term heat resistance in a case where an inorganic substrate having a large surface roughness is used as well.

Means for Solving the Problems

In other words, the present invention includes the following configurations.

[1] A laminate including an inorganic substrate, a silane coupling agent layer, and a heat-resistant polymer film in this order, in which the following (A) to (C) are satisfied:

(A) a peel strength F0 when the heat-resistant polymer film is peeled off from the inorganic substrate at 90° is 1.0 N/cm or more and 20 N/cm or less;

(B) an area of a peeled off part at an interface between the inorganic substrate and the silane coupling agent layer is 20% or less of an entire peeled off surface on an inorganic substrate surface after the heat-resistant polymer film has been peeled off from the inorganic substrate at 90°; and (C) a peel strength F1 when the heat-resistant polymer film is peeled off from the inorganic substrate at 90° after the laminate has been heated at 350° C. for 500 hours in a nitrogen atmosphere is greater than the F0.

[2] The laminate according to [1], in which a thickness of the silane coupling agent layer of the laminate is 0.01 times or more a surface roughness (P-V value) of the inorganic substrate.

[3] The laminate according to [1] or [2], in which the inorganic substrate contains a 3d metal element.

[4] The laminate according to any one of [1] to [3], in which the inorganic substrate is one or more selected from the group consisting of SUS, copper, brass, iron, and nickel.

[5] The laminate according to any one of [1] to [4], in which the heat-resistant polymer film is a polyimide film.

[6] A probe card including the laminate according to any one of [1] to [5] as a constituent member.

[7] A flat cable including the laminate according to any one of [1] to [5] as a constituent member.

[8] A heating unit including the laminate according to any one of [1] to [5] as a constituent member.

[9] An electrical or electronic substrate including the laminate according to any one of [1] to [5] as a constituent member.

[10] A solar cell including the laminate according to any one of [1] to [5] as a constituent member.

[11] A method for manufacturing a laminate including an inorganic substrate, a silane coupling agent layer, and a heat-resistant polymer film in this order, the method including:

(1) a step of applying a silane coupling agent to at least one surface of an inorganic substrate;

(2) a step of superimposing a heat-resistant polymer film on the silane coupling agent-coated surface of the inorganic substrate; and (3) a step of pressurizing the inorganic substrate and heat-resistant polymer film, wherein an area of a peak attributed to a functional group is 15 or less in a spectrum acquired by applying the silane coupling agent to a KBr plate by the same coating method as in step (1) to fabricate a coated plate and measuring the coated plate by infrared microspectroscopy.

Effect of the Invention

According to the present invention, it is possible to provide a laminate that exhibits excellent long-term heat resistance and excellent quality in a case where an inorganic substrate having a large surface roughness is used as well.

BRIEF DESCRIPTION OF THE DRAWINGS

FIG. 6A illustrates the area surrounded by the straight line acquired by linking the peaks at 3400 $cm^{-1}$ and 2400 $cm^{-1}$ and the spectrum after adjusting the height of the peak near 1030 $cm^{-1}$ to 0.055 (a.u.) and the height of the valley (minimum value) near 840 $cm^{-1}$ to 0.012 (a.u.). FIG. 6B illustrates the area surrounded by the straight line acquired by linking the peaks at 3000 $cm^{-1}$ and 2770 $cm^{-1}$ and the spectrum after adjusting the peak heights in the same manner as in FIG. 6A.

MODE FOR CARRYING OUT THE INVENTION

<Heat-Resistant Polymer Film>

Figure 1:
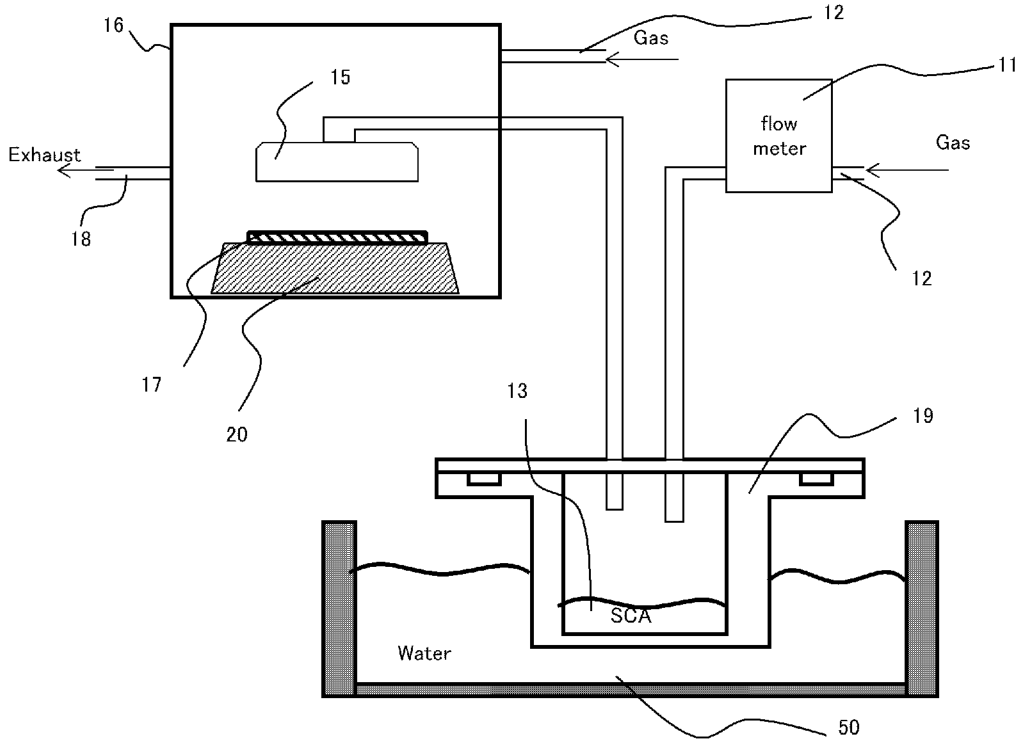
FIG. 1 is a schematic diagram illustrating an example of a silane coupling agent applying apparatus according to an embodiment of the present invention. The apparatus illustrated in FIG. 1 is equipped with a silane coupling agent spray nozzle and an ultrasonication bath.

Examples of the heat-resistant polymer film (hereinafter also referred to as polymer film) in the present invention include films of polyimide-based resins such as aromatic polyimides including polyimide, polyamideimide, polyetherimide, and fluorinated polyimide or alicyclic polyimide, polysulfone, polyethersulfone, polyetherketone, cellulose acetate, cellulose nitrate, aromatic polyamide, and polyphenylene sulfide.

However, since the polymer film is premised on being used in a process involving heat treatment at 350° C. or more and after being heated to 350° C. or more, those that can actually be adopted among the exemplified polymer films are limited. Among the polymer films, a film obtained using a so-called super engineering plastic is preferable, and more specific examples include an aromatic polyimide film, an aromatic amide film, an aromatic amide-imide film, an aromatic benzoxazole film, an aromatic benzothiazole film, and an aromatic benzimidazole film.

The tensile modulus of the polymer film is preferably 2 GPa or more, more preferably 4 GPa or more, still more preferably 7 GPa or more at 25° C. from the viewpoint of suitably mounting functional elements. The tensile modulus of the polymer film at 25° C. can be set to, for example, 15 GPa or less or 10 GPa or less from the viewpoint of flexibility.

The details of the polyimide-based resin films (also referred to as polyimide films), which are an example of the polymer film, will be described below. Generally, a polyimide-based resin film is obtained by applying a polyamic acid (polyimide precursor) solution which is obtained by a reaction between a diamine and a tetracarboxylic acid in a solvent, to a support for polyimide film fabrication, drying the solution to form a green film (hereinafter, also called as a "polyamic acid film"), and treating the green film by heat at a high temperature to cause a dehydration ring-closure reaction on the support for polyimide film fabrication or in a state of being peeled off from the support.

For the application of the polyamic acid (polyimide precursor) solution, it is possible to appropriately use, for example, conventionally known solution application means such as spin coating, doctor blade, applicator, comma coater, screen printing method, slit coating, reverse coating, dip coating, curtain coating, and slit die coating.

The diamines constituting the polyamic acid are not particularly limited, and aromatic diamines, aliphatic diamines, alicyclic diamines and the like which are usually used for polyimide synthesis can be used. From the viewpoint of the heat resistance, aromatic diamines are preferable, and among the aromatic diamines, aromatic diamines having a benzoxazole structure are more preferable. When aromatic diamines having a benzoxazole structure are used, a high elastic modulus, low heat shrinkability, and a low coefficient of linear thermal expansion as well as the high heat resistance can be exerted. The diamines can be used singly or in combination of two or more kinds thereof.

The aromatic diamines having benzoxazole structures are not particularly limited, and examples thereof include: 5-amino-2-(p-aminophenyl)benzoxazole; 6-amino-2-(p-aminophenyl)benzoxazole; 5-amino-2-(m-aminophenyl)benzoxazole; 6-amino-2-(m-aminophenyl)benzoxazole; 2,2'-p-phenylenebis(5-aminobenzoxazole); 2,2'-p-phenylenebis(6-aminobenzoxazole); 1-(5-aminobenzoxazolo)-4-(6-aminobenzoxazolo)benzene; 2,6-(4,4'-diaminodiphenyl)benzo[1,2-d:5,4-d']bisoxazole; 2,6-(4,4'-diaminodiphenyl)benzo[1,2-d:4,5-d']bisoxazole; 2,6-(3,4'-diaminodiphenyl)benzo[1,2-d:5,4-d']bisoxazole; 2,6-(3,4'-diaminodiphenyl)benzo[1,2-d:4,5-d']bisoxazole; 2,6-(3,3'-diaminodiphenyl)benzo[1,2-d:5,4-d']bisoxazole; and 2,6-(3,3'-diaminodiphenyl)benzo[1,2-d:4,5-d']bisoxazole.

Examples of the aromatic diamines other than the above-described aromatic diamines having benzoxazole structures include: 2,2'-dimethyl-4,4'-diaminobiphenyl; 1,4-bis[2-(4-aminophenyl)-2-propyl]benzene(bisaniline); 1,4-bis(4-amino-2-trifluoromethylphenoxy)benzene; 2,2'-ditrifluoromethyl-4,4'-diaminobiphenyl; 4,4'-bis(4-aminophenoxy)biphenyl; 4,4'-bis(3-aminophenoxy)biphenyl; bis[4-(3-aminophenoxy)phenyl]ketone; bis[4-(3-aminophenoxy)phenyl]sulfide; bis[4-(3-aminophenoxy)phenyl]sulfone; 2,2-bis[4-(3-aminophenoxy)phenyl]propane; 2,2-bis[4-(3-aminophenoxy)phenyl]-1,1,1,3,3,3-hexafluoropropane; m-phenylenediamine; o-phenylenediamine; p-phenylenediamine; m-aminobenzylamine; p-aminobenzylamine; 3,3'-diaminodiphenylether; 3,4'-diaminodiphenylether; 4,4'-diaminodiphenylether; 3,3'-diaminodiphenylsulfide; 3,3'-diaminodiphenylsulfoxide; 3,4'-diaminodiphenylsulfoxide; 4,4'-diaminodiphenylsulfoxide; 3,3'-diaminodiphenylsulfone; 3,4'-diaminodiphenylsulfone; 4,4'-diaminodiphenylsulfone; 3,3'-diaminobenzophenone; 3,4'-diaminobenzophenone; 4,4'-diaminobenzophenone; 3,3'-diaminodiphenylmethane; 3,4'-diaminodiphenylmethane; 4,4'-diaminodiphenylmethane; bis[4-(4-aminophenoxy)phenyl]methane; 1,1-bis[4-(4-aminophenoxy)phenyl]ethane; 1,2-bis[4-(4-aminophenoxy)phenyl]ethane; 1,1-bis[4-(4-aminophenoxy)phenyl]propane; 1,2-bis[4-(4-aminophenoxy)phenyl]propane; 1,3-bis[4-(4-aminophenoxy)phenyl]propane; 2,2-bis[4-(4-aminophenoxy)phenyl]propane; 1,1-bis[4-(4-aminophenoxy)phenyl]butane; 1,3-bis[4-(4-aminophenoxy)phenyl]butane; 1,4-bis[4-(4-aminophenoxy)phenyl]butane; 2,2-bis[4-(4-aminophenoxy)phenyl]butane; 2,3-bis[4-(4-aminophenoxy)phenyl]butane; 2-[4-(4-aminophenoxy)phenyl]-2-[4-(4-aminophenoxy)-3-methylphenyl]propane; 2,2-bis[4-(4-aminophenoxy)-3-methylphenyl]propane; 2-[4-(4-aminophenoxy)phenyl]-2-[4-(4-aminophenoxy)-3,5-dimethylphenyl]propane; 2,2-bis[4-(4-aminophenoxy)-3,5-dimethylphenyl]propane; 2,2-bis[4-(4-aminophenoxy)phenyl]-1,1,1,3,3,3-hexafluoropropane; 1,4-bis(3-aminophenoxy)benzene; 1,3-bis(3-aminophenoxy)benzene; 1,4-bis(4-aminophenoxy)benzene; 4,4'-bis(4-aminophenoxy)biphenyl; bis[4-(4-aminophenoxy)phenyl]ketone; bis[4-(4-aminophenoxy)phenyl]sulfide; bis[4-(4-aminophenoxy)phenyl]sulfoxide; bis[4-(4-aminophenoxy)phenyl]sulfone; bis[4-(3-aminophenoxy)phenyl]ether; bis[4-(4-aminophenoxy)phenyl]ether; 1,3-bis[4-(4-aminophenoxy)benzoyl]benzene; 1,3-bis[4-(3-aminophenoxy)benzoyl]benzene; 1,4-bis[4-(3-aminophenoxy)benzoyl]benzene; 4,4'-bis[(3-aminophenoxy)benzoyl]benzene; 1,1-bis[4-(3-aminophenoxy)phenyl]propane; 1,3-bis[4-(3-aminophenoxy)phenyl]propane; 3,4'-diaminodiphenylsulfide; 2,2-bis[3-(3-aminophenoxy)phenyl]-1,1,1,3,3,3-hexafluoropropane; bis[4-(3-aminophenoxy)phenyl]methane; 1,1-bis[4-(3-aminophenoxy)phenyl]ethane; 1,2-bis[4-(3-aminophenoxy)phenyl]ethane; bis[4-(3-aminophenoxy)phenyl]sulfoxide; 4,4'-bis[3-(4-aminophenoxy)benzoyl]diphenylether; 4,4'-bis[3-(3-aminophenoxy)benzoyl]diphenylether; 4,4'-bis[4-(4-amino-α,α-dimethylbenzyl)phenoxy]benzophenone; 4,4'-bis[4-(4-amino-α,α-dimethylbenzyl)phenoxy]diphenylsulfone; bis[4-{4-(4-aminophenoxy)phenoxy}phenyl]sulfone; 1,4-bis[4-(4-aminophenoxy)phenoxy-α,α-dimethylbenzyl]benzene; 1,3-bis[4-(4-aminophenoxy)phenoxy-α,α-dimethylbenzyl]benzene; 1,3-bis[4-(4-amino-6-trifluoromethylphenoxy)-α,α-dimethylbenzyl]benzene; 1,3-bis[4-(4-amino-6-fluorophenoxy)-α,α-dimethylbenzyl]benzene; 1,3-bis[4-(4-amino-6-methylphenoxy)-α,α-dimethylbenzyl]benzene; 1,3-bis[4-(4-amino-6-cyanophenoxy)-α,α-dimethylbenzyl]benzene; 3,3'-diamino-4,4'-diphenoxybenzophenone; 4,4'-diamino-5,5'-diphenoxybenzophenone; 3,4'-diamino-4,5'-diphenoxybenzophenone; 3,3'-diamino-4-phenoxybenzophenone; 4,4'-diamino-5-phenoxybenzophenone, 3,4'-diamino-4-phenoxybenzophenone; 3,4'-diamino-5'-phenoxybenzophenone; 3,3'-diamino-4,4'-dibiphenoxybenzophenone; 4,4'-diamino-5,5'-dibiphenoxybenzophenone; 3,4'-diamino-4,5'-dibiphenoxybenzophenone; 3,3'-diamino-4-biphenoxybenzophenone; 4,4'-diamino-5-biphenoxybenzophenone; 3,4'-diamino-4-biphenoxybenzophenone; 3,4'-diamino-5'-biphenoxybenzophenone; 1,3-bis(3-amino-4-phenoxybenzoyl)benzene; 1,4-bis(3-amino-4-phenoxybenzoyl)benzene; 1,3-bis(4-amino-5-phenoxybenzoyl)benzene; 1,4-bis(4-amino-5-phenoxybenzoyl)benzene; 1,3-bis(3-amino-4-biphenoxybenzoyl)benzene, 1,4-bis(3-amino-4-biphenoxybenzoyl)benzene; 1,3-bis(4-amino-5-biphenoxybenzoyl)benzene; 1,4-bis(4-amino-5-biphenoxybenzoyl)benzene; 2,6-bis[4-(4-amino-α,α-dimethylbenzyl)phenoxy]benzonitrile; and aromatic diamines obtained by substituting a part or all of hydrogen atoms on an aromatic ring of the above-described aromatic diamines with halogen atoms; C1-3 alkyl groups or alkoxyl groups; cyano groups; or C1-3 halogenated alkyl groups or alkoxyl groups in which a part or all of hydrogen atoms of an alkyl group or alkoxyl group are substituted with halogen atoms.

Examples of the aliphatic diamines include: 1,2-diaminoethane; 1,4-diaminobutane; 1,5-diaminopentane; 1,6-diaminohexane; and 1,8-diaminooctane.

Examples of the alicyclic diamines include: 1,4-diaminocyclohexane and 4,4-methylenebis(2,6-dimethylcyclohexylamine).

The total amount of diamines (aliphatic diamines and alicyclic diamines) other than the aromatic diamines is preferably 20% by mass or less, more preferably 10% by mass or less, still more preferably 5% by mass or less of the total amount of all the diamines. In other words, the amount of aromatic diamines is preferably 80% by mass or more, more preferably 90% by mass or more, still more preferably 95% by mass or more of the total amount of all the diamines.

As tetracarboxylic acids constituting the polyamic acid, aromatic tetracarboxylic acids (including anhydrides thereof), aliphatic tetracarboxylic acids (including anhydrides thereof) and alicyclic tetracarboxylic acids (including anhydrides thereof), which are usually used for polyimide synthesis, can be used. Among these, aromatic tetracarboxylic anhydrides and alicyclic tetracarboxylic anhydrides are preferable, aromatic tetracarboxylic anhydrides are more preferable from the viewpoint of the heat resistance, and alicyclic tetracarboxylic acids are more preferable from the viewpoint of light transmittance. In a case where these are acid anhydrides, the acid anhydrides may have one anhydride structure or two anhydride structures in the molecule, but one (dianhydride) having two anhydride structures in the molecule is preferable. The tetracarboxylic acids may be used singly or in combination of two or more kinds thereof.

Examples of the alicyclic tetracarboxylic acids include: alicyclic tetracarboxylic acids such as cyclobutanetetracarboxylic acid; 1,2,4,5-cyclohexanetetracarboxylic acid; 3,3',4,4'-bicyclohexyltetracarboxylic acid; and anhydrides thereof. Among these, dianhydrides having two anhydride structures (for example, cyclobutanetetracarboxylic dianhydride, 1,2,4,5-cyclohexanetetracarboxylic dianhydride, 3,3',4,4'-bicyclohexyltetracarboxylic dianhydride and the like) are suitable. Incidentally, the alicyclic tetracarboxylic acids may be used singly or in combination of two or more kinds thereof.

For obtaining high transparency, the amount of the alicyclic tetracarboxylic acids is preferably 80% by mass or more, more preferably 90% by mass or more, still more preferably 95% by mass or more of, for example, the total amount of all the tetracarboxylic acids.

The aromatic tetracarboxylic acids are not particularly limited, but a pyromellitic acid residue (namely, one having a structure derived from pyromellitic acid) is preferable, and an anhydride thereof is more preferable. Examples of these aromatic tetracarboxylic acids include: pyromellitic dianhydride; 3,3',4,4'-biphenyltetracarboxylic dianhydride; 4,4'-oxydiphthalic dianhydride; 3,3',4,4'-benzophenonetetracarboxylic dianhydride; 3,3',4,4'-diphenylsulfonetetracarboxylic dianhydride; and 2,2-bis[4-(3,4-dicarboxyphenoxy)phenyl]propionic anhydride.

For obtaining high heat resistance, the amount of the aromatic tetracarboxylic acids is preferably 80% by mass or more, more preferably 90% by mass or more, still more preferably 95% by mass or more of, for example, the total amount of all the tetracarboxylic acids.

The thickness of the polymer film is preferably 3 μm or more, more preferably 11 μm or more, still more preferably 24 μm or more, yet still more preferably 45 μm or more. The upper limit of the thickness of the polymer film is not particularly limited but is preferably 250 μm or less, more preferably 150 μm or less, still more preferably 90 μm or less for use as a flexible electronic device.

The average CTE of the polymer film at between 30° C. and 500° C. is preferably −5 ppm/° C. to +20 ppm/° C., more preferably −5 ppm/° C. to +15 ppm/° C., still more preferably 1 ppm/° C. to +10 ppm/° C. When the CTE is in the above range, a small difference in coefficient of linear thermal expansion between the polymer film and a general support (inorganic substrate) can be maintained, and the polymer film and the inorganic substrate can be prevented from peeling off from each other when being subjected to a process of applying heat as well. Here, CTE is a factor that indicates reversible expansion and contraction with respect to temperature. The CTE of the polymer film refers to the average value of the CTE in the machine direction (MD direction) and the CTE in the transverse direction (TD direction) of the polymer film.

The heat shrinkage rate of the polymer film at between 30° C. and 500° C. is preferably ±0.9%, still more preferably ±0.6%. The heat shrinkage rate is a factor that represents irreversible expansion and contraction with respect to the temperature.

The tensile breaking strength of the polymer film is preferably 60 MPa or more, more preferably 120 MP or more, still more preferably 240 MPa or more. The upper limit of the tensile breaking strength is not particularly limited but is practically less than about 1000 MPa. The tensile breaking strength of the polymer film refers to the average value of the tensile breaking strength in the machine direction (MD direction) and the tensile breaking strength in the transverse direction (TD direction) of the polymer film.

The tensile breaking elongation of the polymer film is preferably 1% or more, more preferably 5% or more, still more preferably 20% or more. When the tensile breaking elongation is 1% or more, the handleability is excellent. The tensile breaking elongation of the polymer film refers to the average value of the tensile breaking elongation in the machine direction (MD direction) and the tensile breaking elongation in the transverse direction (TD direction) of the polymer film.

The thickness unevenness of the polymer film is preferably 20% or less, more preferably 12% or less, still more preferably 7% or less, particularly preferably 4% or less. When the thickness unevenness exceeds 20%, it tends to be difficult to apply the film to narrow portions. The film thickness unevenness can be determined by, for example, randomly extracting about 10 positions from the film to be measured, measuring the film thickness using a contact-type film thickness meter, and calculating based on the following equation.

$$\text{Film thickness unevenness (\%)} = 100 \times (\text{maximum film thickness} - \text{minimum film thickness}) \div \text{average film thickness}$$

The polymer film is preferably one obtained in the form of being wound as a long polymer film having a width of 300 mm or more and a length of 10 m or more at the time of manufacture, more preferably one in the form of a roll-shaped polymer film wound around a winding core. When the polymer film is wound in a roll shape, it is easy to transport the polymer film in the form of a polymer film wound in a roll shape.

In order to secure handleability and productivity of the polymer film, a lubricant (particles) having a particle size of about 10 to 1000 nm is preferably added to/contained in the polymer film at about 0.03 to 3% by mass to impart fine unevenness to the surface of the polymer film and secure slipperiness.

The shape of the polymer film is preferably aligned to the shape of the laminate. Specifically, a rectangle, a square, or a circle may be mentioned, and a rectangle is preferred.

Surface Activation Treatment of Polymer Film

The polymer film may have been subjected to surface activation treatment. By subjecting the polymer film to surface activation treatment, the surface of the polymer film is modified to a state of having a functional group (so-called activated state), and the adhesive property to the inorganic substrate via the silane coupling agent is improved.

The surface activation treatment in the present specification is dry or wet surface treatment. Examples of the dry surface treatment include vacuum plasma treatment, normal pressure plasma treatment, treatment of irradiating the surface with active energy rays such as ultraviolet rays, electron beams, and X rays, corona treatment, flame treatment, and Itro treatment. Examples of the wet surface treatment include treatment of bringing the surface of the polymer film into contact with an acid or alkali solution.

A plurality of the surface activation treatments may be performed in combination. In the surface activation treatment, the surface of the polymer film is cleaned and an active functional group is produced. The produced functional group is bound to the silane coupling agent layer described later through hydrogen bonding, chemical reaction, and the like, and it is possible to firmly paste the polymer film to a silane coupling agent-derived adhesive layer and/or a silicone-derived adhesive layer.

Silane Coupling Agent Layer

The adhesive layer is a layer formed of a silane coupling agent-derived adhesive layer and/or a silicone-derived adhesive layer. The adhesive layer may be a layer formed by coating the inorganic substrate, or may be a layer formed by coating the polymer film. It is preferable to coat the inorganic substrate since the surface of the inorganic substrate having a large surface roughness can be easily flattened. The details of the method for forming the adhesive layer will be described in the section of the method for manufacturing a laminate.

The silane coupling agent contained in the silane coupling agent-derived adhesive layer is not particularly limited, but preferably contains a coupling agent having an amino group.

Preferred specific examples of the silane coupling agent include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, aminophenyltrimethoxysilane, aminophenethyltrimethoxysilane, and aminophenylaminomethylphenethyltrimethoxysilane. When particularly high heat resistance is required in the process, a silane coupling agent, in which an aromatic group links Si and an amino group to each other, is desirable.

It is preferable that the thickness of the silane coupling agent layer is 0.01 times or more the surface roughness (P-V value) of the inorganic substrate. The thickness is more preferably 0.05 times or more, still more preferably 0.08 times or more, particularly preferably 0.1 times or more since the irregularities of the surface of the inorganic substrate are filled and a flat surface can be easily formed. The upper limit is not particularly limited, but is preferably 1000 times or less, more preferably 600 times or less, still more preferably 400 times or less since the initial adhesive strength F0 becomes favorable. By setting the thickness to be in the above range, a laminate exhibiting excellent long-term heat resistance can be fabricated. In particular, if the heat-resistant polymer film to be bonded is rigid and is not deformed by irregularities of the surface of the base material, it is preferable that the silane coupling agent layer is thick and the adhesive surface is as flat as possible. The method for measuring the thickness of the silane coupling agent layer is as described in Examples. In a case where the thickness of the silane coupling agent layer is not uniform, the thickness of the thickest part of the silane coupling agent layer is taken as the thickness.

The relation between the thickness of the silane coupling agent layer and the surface roughness (P-V) of the inorganic substrate is preferably in the above range, and specifically, the thickness of the silane coupling agent layer is preferably 0.1 μm or more, more preferably 0.15 μm or more, still more preferably 0.2 μm or more. The thickness of the adhesive layer is preferably 20 μm or less, more preferably 15 μm or less, still more preferably 10 μm or less.

<Inorganic Substrate>

The inorganic substrate preferably contains a 3d metal element (3d transition element). Specific examples of 3d metal elements include scandium (Sc), titanium (Ti), vanadium (V), chromium (Cr), manganese (Mn), iron (Fe), cobalt (Co), nickel (Ni), or copper (Cu), and the metal base material may be a single element metal using these metals singly or may be an alloy containing two or more kinds thereof. The metal base material is preferably in the form of a plate or metal foil that can be used as a substrate formed of the metal. Specifically, the metal base material is preferably SUS, copper, brass, iron, nickel, Inconel, SK steel, nickel-plated iron, nickel-plated copper, or Monel. More specifically, the metal base material is preferably one or more metal foils selected from the group consisting of SUS, copper, brass, iron, and nickel.

The metal base material may be an alloy containing tungsten (W), molybdenum (Mo), platinum (Pt), or gold (Au) in addition to the 3d metal elements. In the case where a metal element other than a 3d metal element is contained, the 3d element metal is contained at preferably 50% by mass or more, more preferably 80% by mass or more, still more preferably 90% by mass or more, particularly preferably 99% by mass or more.

The laminate of the present invention exhibits excellent long-term heat resistance in a case where an inorganic substrate having a large surface roughness is used as well. Hence, the surface roughness (P-V value) of the inorganic substrate is preferably 0.1 μm or more, more preferably more than 0.1 μm, still more preferably 0.15 μm or more, yet still more preferably 0.2 μm or more, particularly preferably 0.25 μm or more. The upper limit is preferably 20 μm or less, more preferably 19 μm or less, still more preferably 18 μm or less.

The thickness of the inorganic substrate is not particularly limited, and is preferably 0.001 mm or more, more preferably 0.01 mm or more, still more preferably 0.1 mm or more. The thickness of the metal base material is preferably 2 mm or less, more preferably 1 mm or less, still more preferably 0.5 mm or less. By setting the thickness of the inorganic substrate to be in the above range, it is easy to use the laminate in uses such as a probe guard to be described later.

<Laminate>

The laminate of the present invention is a laminate in which the heat-resistant polymer film, the silane coupling agent layer, and the inorganic substrate are laminated in this order. In the laminate, the adhesive strength F0 when the heat-resistant polymer film is peeled off from the inorganic substrate at 90° (hereinafter, also referred to as 90° peel method) is 1.0 N/cm or more and 20 N/cm or less, and the adhesive strength F1 between the inorganic substrate and the heat-resistant polymer film by the 90° peel method (hereinafter, also referred to as long-term heat resistance test) after the laminate has been heated at 350° C. for 500 hours in a nitrogen atmosphere is greater than the F0. Here, F0 is the peel strength between a heat-resistant polymer and an inorganic substrate of a laminate obtained by bonding the inorganic substrate to the heat-resistant polymer film and then performing heating at 200° C. for 1 hour.

The adhesive strength F0 is required to be 1.0 N/cm or more. The adhesive strength F0 is more preferably 1.2 N/cm or more, still more preferably 1.5 N/cm or more, particularly preferably 2.0 N/cm or more since it is easier to prevent accidents such as peeling off and misregistration of the polymer film during device fabrication (mounting process). The upper limit of the adhesive strength F0 is not particularly regulated, but is preferably 20 N/cm or less, still more preferably 15 N/cm or less, yet still more preferably 10 N/cm or less, particularly preferably 5 N/cm or less from the viewpoint of damage to the heat-resistant polymer film during peeling off.

The adhesive strength F1 is required to be greater than the F0. The rate of increase in adhesive strength ($F1/F0\times100-100(\%)$) is preferably 1% or more, more preferably 5% or more, still more preferably 10% or more, yet still more preferably 50% or more, particularly preferably 100% or more since the adhesive strength of the laminate is maintained after a long-term heat resistance test as well, it is easy to fabricate a device, and it is easier to prevent troubles such as peeling off and blistering during long-term use. The rate of increase in adhesive strength is preferably 500% or less, more preferably 400% or less, still more preferably 300% or less, particularly preferably 200% or less.

The adhesive strength F1 is not particularly limited as long as it satisfies the rate of increase in adhesive strength, but is preferably more than 1.0 N/cm. The adhesive strength F1 is more preferably 2 N/cm or more, still more preferably 3 N/cm or more, particularly preferably 4 N/cm or more since it is easier to prevent the accident of peeling off of the polymer film during device fabrication. The upper limit of the adhesive strength F1 is not particularly regulated, but is preferably 30 N/cm or less, more preferably 20 N/cm or less, still more preferably 15 N/cm or less, particularly preferably 10 N/cm or less from the viewpoint of damage to the heat-resistant polymer film during peeling off.

In other words, in the present invention, by setting the adhesive strength before and after the long-term heat resistance test to be in the above ranges, it is possible to prevent the accident of peeling off during the processing process and actual use. The method for achieving the adhesive strength is not particularly limited, and examples thereof include setting the ratio of the adhesive layer to the surface roughness (P-V) of the inorganic substrate to be in a predetermined range, setting the thickness of the adhesive layer to be in a predetermined range, and suppressing self-condensation of the silane coupling agent applied to the inorganic substrate.

In the present invention, it is required that the area of the peeled off part at the interface between the inorganic substrate and the silane coupling agent layer is 20% or less of the entire peeled off surface on the inorganic substrate surface after the heat-resistant polymer film has been peeled off from the laminate at 90°. In the laminate of the present invention, since a heat-resistant polymer film, a silane coupling agent layer, and an inorganic substrate are laminated in this order, four patterns of peeling modes of (1) peeling off of the inorganic substrate and the silane coupling agent layer from each other, (2) cohesive fracture of the silane coupling agent layer, (3) peeling off of the silane coupling agent layer and the heat-resistant polymer film from each other, and (4) cohesive fracture in the heat-resistant polymer film are assumed in a case where the laminate is subjected to peeling off. Among these, in the present invention, the area of the (1) peeled off part between the inorganic substrate and the silane coupling agent layer is required to be 20% or less of the entire peeled off surface. The area is preferably 15% or less since the silane coupling agent layer is uniformly formed between the inorganic substrate and the heat-resistant polymer film, the close contact property of each layer of the laminate is uniform, and the unevenness between parts exhibiting strong close contact properties and parts exhibiting weak close contact properties decreases. In a case where the silane coupling agent layer is not uniformly formed on the inorganic substrate, a sea-island structure is observed on the inorganic substrate surface after the heat-resistant polymer film has been peeled off from the laminate at 90°, and the area of the peeled off part at the interface between the inorganic substrate and the silane coupling agent may exceed 20% of the entire peeled off surface. Meanwhile, in a case where the silane coupling agent layer is uniformly formed and the pasted surface is sufficiently smooth, the sea-island structure is not observed, and the area of the peeled off part at the interface between the inorganic substrate and the silane coupling agent layer is 20% or less of the entire peeled off surface. When the area of the peeled off part at the interface between the inorganic substrate and the silane coupling agent is 20% or less, there is no unevenness in the peel strength and the close contact between the inorganic substrate and the heat-resistant polymer film, and it is possible to suppress the occurrence of floating without bubbles immediately after lamination and when the laminate is heated to a high temperature. The area of the peeled off part at the interface between the inorganic substrate and the silane coupling agent layer is preferably as small as possible, and is thus preferably 0%, but industrially, may be 1% or more, or 2% or more.

Figure 6A:
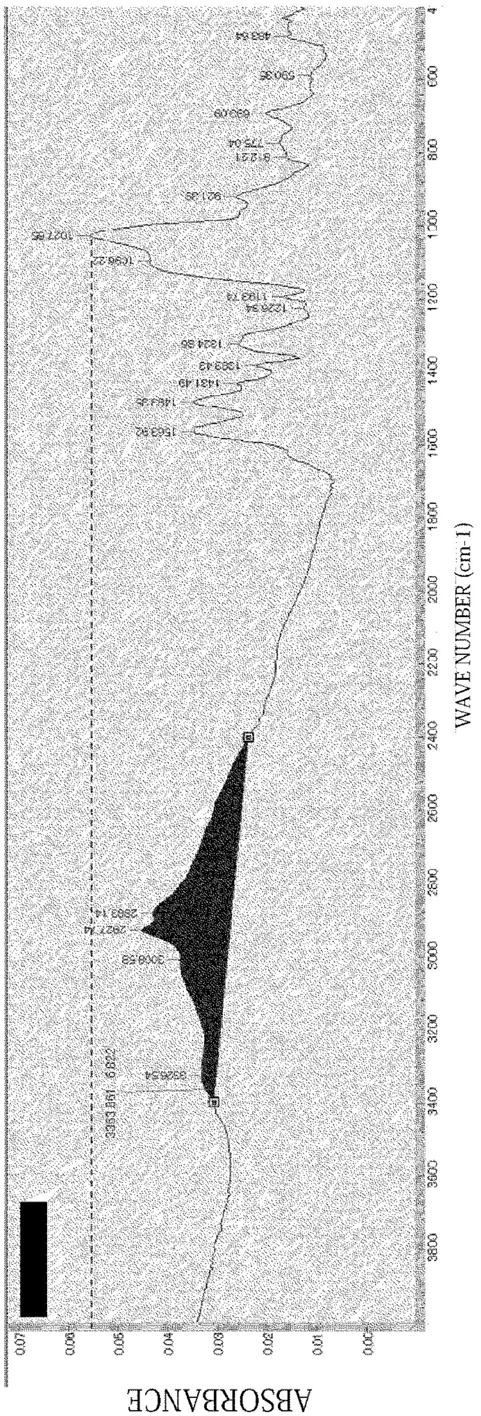
FIGS. 6A and 6B illustrate a spectrum of a silane coupling agent-coated plate obtained in Example 9 by infrared microspectroscopy.
Figure 6B:
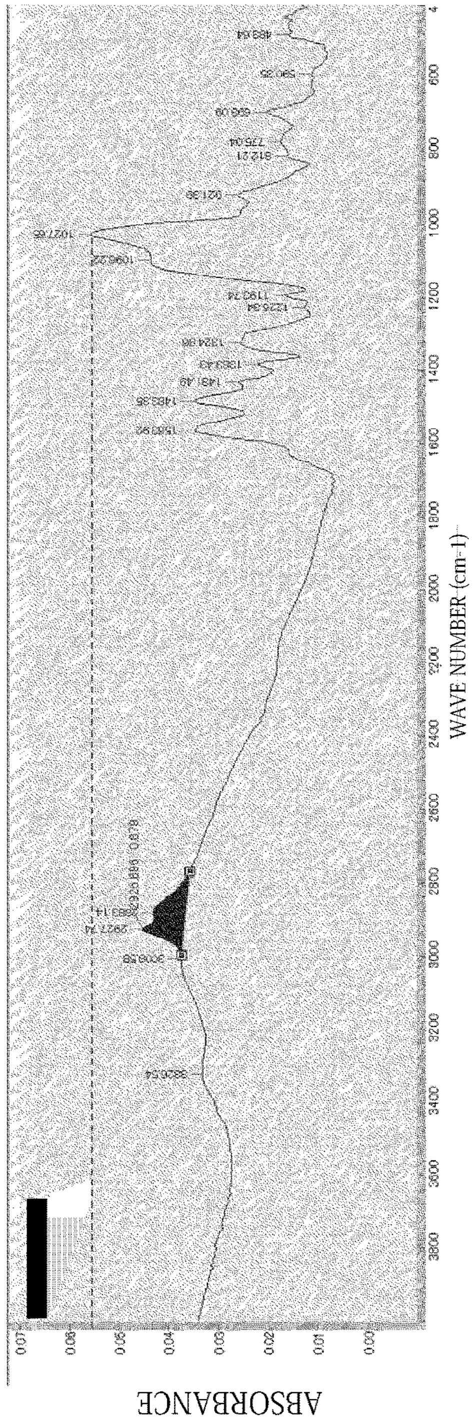

In the present invention, the manufacture of the laminate includes at least: (1) a step of applying a silane coupling agent to at least one surface of an inorganic substrate, (2) a step of superimposing a heat-resistant polymer film on the silane coupling agent-coated surface of the inorganic substrate; and (3) a step of pressurizing the inorganic substrate and heat-resistant polymer film. The area of peaks attributed to various functional groups (functional groups in general) is preferably 15 or less in the spectrum acquired by applying the silane coupling agent to a KBr (potassium bromide) plate by the same coating method as in step (1) to fabricate a coated plate and measuring the coated plate by infrared microspectroscopy (transmission method). The area is more preferably 10 or less. The lower limit is not particularly limited, but may be 1 or more, or 2 or more. In the present invention, since the silane coupling agent applied to the inorganic substrate cannot be directly measured by infrared microspectroscopy, a KBr plate is used as the inorganic substrate, and the coated KBr plate is subjected to the measurement by infrared microspectroscopy. Specifically, certain processing is performed on the spectrum acquired through measurement by infrared microspectroscopy, and the value acquired by subtracting the area (see FIG. 6B) in the wave number range of 3000 $cm^{-1}$ to 2770 $cm^{-1}$ with base points of 3000 $cm^{-1}$ and 2770 $cm^{-1}$ corresponding to hydrocarbons from the area (see FIG. 6A) in the wave number range of 3400 $cm^{-1}$ to 2400 $cm^{-1}$ with base points of 3400 $cm^{-1}$ and 2400 $cm^{-1}$ corresponding to various functional groups (functional groups in general) is calculated as the peak area attributed to functional groups. More specifically, the peak area is calculated by the method described in Examples. When the area of peaks attributed to functional groups is 15 or less in the spectrum acquired by subjecting the coated KBr plate to the measurement by infrared microspectroscopy, the number of functional groups of the silane coupling agent is small, and thus the silane coupling agent on the inorganic substrate is less likely to undergo self-condensation and is more likely to uniformly react with the heat-resistant polymer film. For example, in a case where the heat-resistant polymer film is a polyimide film, the carbonyl groups of the polyimide are likely to uniformly react with the alkoxy groups of the silane coupling agent. Examples of the method for controlling the area of peaks attributed to functional groups to 15 or less in the spectrum acquired by subjecting the coated KBr plate to the measurement by infrared microspectroscopy include a method in which conversion of methoxy groups into silanol groups is promoted when the silane coupling agent is applied. Specifically, this can be achieved by generating microdroplets of silane coupling agent by heating or ultrasonic irradiation and spraying the microdroplets onto KBr (inorganic substrate). It is possible to promote conversion into silanol groups by applying a silane coupling agent to an inorganic substrate as an undiluted solution or using a solvent such as water or alcohol and exposing the inorganic substrate to moisture as well, but the surface area of silane coupling agent increases and a state of containing converted silanol groups can be efficiently created by forming microdroplets. Furthermore, a large amount of silane coupling agent can be applied to the inorganic substrate by controlling the heating temperature and application time of the silane coupling agent. By increasing the amount of silane coupling agent applied, the silane coupling agent is once formed into microdroplets, and the silane coupling agent containing converted silanol groups is in a liquid state on the inorganic substrate. Since the silane coupling agent in a liquid state covers the irregularities of the inorganic substrate surface, the inorganic substrate surface is smoothed, and the inorganic substrate and the heat-resistant polymer film can be bonded together evenly and uniformly.

The laminate of the present invention can be fabricated, for example, according to the following procedure. A laminate can be obtained by treating at least one surface of the inorganic substrate with a silane coupling agent in advance, superimposing the surface treated with a silane coupling agent on the polymer film, and pressurizing the two for lamination. A laminate can also be obtained by treating at least one surface of the polymer film with a silane coupling agent in advance, superimposing the surface treated with a silane coupling agent on the inorganic substrate, and pressurizing the two for lamination. Examples of the silane coupling agent treatment method include a method in which the silane coupling agent is vaporized (formed into microdroplets) and a gaseous silane coupling agent is applied (gaseous phase coating method) or a spin coating method and a hand coating method in which the silane coupling agent is applied as an undiluted solution or after being dissolved in a solvent. Water vapor may be sprayed onto the inorganic substrate together with a gaseous silane coupling agent, or water vapor may be sprayed onto the inorganic substrate treated with a silane coupling agent. In a case where a silane coupling agent is vaporized, ultrasonic irradiation and heating are effective, and a large amount of silane coupling agent can be vaporized by increasing the ultrasonic output and heating temperature. Specifically, in a case where a silane coupling agent having a boiling point of 200° C. or more is used, the heating temperature is preferably 50° C. or more. In a case where a vaporized silane coupling agent is used, it is preferable that the spray port for the silane coupling agent is close to the inorganic substrate, and for example, it is preferable to heat a silane coupling agent contained in a container and fix the inorganic substrate to the upper part of the container. This is to spray a large amount of silane coupling agent while suppressing self-condensation during the time from the vaporization of silane coupling agent to the arrival of silane coupling agent at the inorganic substrate, and the distance from the spray port to the inorganic substrate is preferably short, and is preferably 20 cm or less in a case where a spray nozzle is used as well. Examples of the pressurization method include ordinary pressing or lamination in the air, or pressing or lamination in a vacuum. In order to acquire stable adhesive strength over the entire surface, lamination in the air is preferred for laminates having a large size (for example, more than 200 mm). In contrast, pressing in a vacuum is preferable in the case of a laminate having a small size of about 200 mm or less. As the degree of vacuum, a degree of vacuum obtained by an ordinary oil-sealed rotary pump is sufficient, and about 10 Torr or less is sufficient. The pressure is preferably 1 MPa to 20 MPa, more preferably 3 MPa to 10 MPa. The base material may be destroyed when the pressure is high, and adhesion may not be achieved at some portions when the pressure is low. The temperature is preferably 90° C. to 300° C., more preferably 100° C. to 250° C. The polymer film may be damaged when the temperature is high, and adhesive force may be weak when the temperature is low.

As the shape of the laminate, a rectangle, a square, or a circle may be mentioned, and a rectangle is preferred. The area of the laminate is preferably 0.01 square meters or more, more preferably 0.1 square meters or more, still more preferably 0.7 square meters or more, particularly preferably 1 square meter or more. The area of the laminate is preferably 5 square meters or less, more preferably 4 square meters or less from the viewpoint of ease of fabrication. In a case where the shape of the laminate is rectangular, the length of one side is preferably 50 mm or more, more preferably 100 mm or more. The upper limit is not particularly limited, but is preferably 1000 mm or less, more preferably 900 mm or less.

The laminate of the present invention can be used as a constituent component of a probe guard, a flat cable, a heating unit (insulated type heater), an electrical or electronic substrate, or a solar cell (back sheet for solar cell). By using the laminate of the present invention in the above-mentioned uses, it is possible to ease the processing conditions (expand the process window) and increase the service life.

EXAMPLES

Preparation of Polyamic Acid Solution A

The inside of a reaction vessel equipped with a nitrogen introducing tube, a thermometer, and a stirring bar was purged with nitrogen, then 223 parts by mass of 5-amino-2-(p-aminophenyl)benzoxazole (DAMBO) and 4416 parts by mass of N,N-dimethylacetamide were added and completely dissolved, subsequently 217 parts by mass of pyromellitic dianhydride (PMDA) and a dispersion obtained by dispersing colloidal silica as a lubricant in dimethylacetamide ("SNOWTEX (registered trademark) DMAC-ST30" manufactured by Nissan Chemical Corporation) were added so that silica (lubricant) was 0.12% by mass of the total amount of polymer solids in the polyamic acid solution, and the mixture was stirred at a reaction temperature of 25° C. for 24 hours to obtain a brown and viscous polyamic acid solution A.

<Fabrication of Heat-Resistant Polymer Film F1>

The polyamic acid solution A obtained above was applied to the smooth surface (lubricant-free surface) of a long polyester film ("A-4100" manufactured by TOYOBO CO., LTD.) having a width of 1050 mm using a slit die so that the final film thickness (film thickness after imidization) was 15 μm, dried at 105° C. for 20 minutes, and then peeled off from the polyester film to obtain a self-supporting polyamic acid film having a width of 920 mm.

Both edges of the polyamic acid film obtained above were gripped with a pin tenter, a heat treatment at 150° C. for 5 minutes in the first stage, 220° C. for 5 minutes in the second stage, and 550° C. for 10 minutes in the third stage was performed for imidization, and the pin grips at both edges were removed by slitting to obtain a long heat-resistant polymer film (F1) (1000 m roll) having a width of 850 mm.

<Vacuum Plasma Treatment of Heat-Resistant Polymer Film F1 (Fabrication of Heat-Resistant Polymer Film F2)>

Vacuum plasma treatment was performed on the heat-resistant polymer film F1 under the following conditions. As the vacuum plasma treatment, the inside of the vacuum chamber was evacuated to $1\times10^{-3}$ Pa or less, argon gas was introduced into the vacuum chamber, and argon plasma treatment was performed for 20 seconds at a discharge power of 100 W and a frequency of 15 kHz using an apparatus for long film treatment, thereby obtaining a heat-resistant polymer film F2.

Preparation of Heat-Resistant Polymer Films F3 and F4

Heat-resistant polymer films F3 and F4 were fabricated by subjecting commercially available polyimide films to plasma treatment in the same manner as the heat-resistant polymer film F2.

F3: UPILEX (registered trademark) 25S (polyimide film manufactured by UBE Corporation, thickness: 25 μm)

F4: Kapton (registered trademark) 100H (polyimide film manufactured by DU PONT-TORAY CO., LTD., thickness: 25 μm)

<Inorganic Substrate>

The following metal base materials were used as the inorganic substrate. As the metal base materials, SUS304 (manufactured by KENIS LIMITED), copper plate (manufactured by KENIS LIMITED), rolled copper foil (manufactured by MITSUI SUMITOMO METAL MINING BRASS & COPPER CO., LTD.), SK steel (manufactured by KENIS LIMITED), nickel-plated iron (manufactured by KENIS LIMITED), nickel-plated copper (manufactured by KENIS LIMITED), aluminum plate (manufactured by KENIS LIMITED), Inconel foil (manufactured by AS ONE Corporation), iron plate (manufactured by AS ONE Corporation), brass plate (manufactured by AS ONE Corporation), and Monel plate (manufactured by AS ONE Corporation) were used. Hereinafter, the metal base material is also simply referred to as a base material or a substrate.

<Cleaning of Inorganic Substrate>

The surface of the inorganic substrate on which a silane coupling agent layer was to be formed was degreased with acetone, ultrasonically cleaned in pure water, and irradiated with UV/ozone for 3 minutes in order.

<Formation of Silane Coupling Agent Layer on Base Material>

A silane coupling agent layer (adhesive layer) was formed on the substrate as a base material by the following method.

Coating Example SC1

A suction bottle 19 filled with 100 parts by mass of silane coupling agent KBM-903 (Shin-Etsu Silicone, 3-aminopropyltrimethoxysilane) was connected to a chamber 16 equipped with an exhaust duct 18, a substrate cooling stage 20 and a silane coupling agent spray spray nozzle 15 via a silicone tube, and then the suction bottle 19 was left to still stand in an ultrasonication bath 50 heated at 45° C. By sealing the suction bottle 19 in a state where instrumentation air could be introduced from above, a state was created in which the vapor of silane coupling agent could be introduced into the chamber 16 (FIG. 1). An inorganic substrate 17 was placed horizontally on the substrate cooling stage 20 with the UV irradiated surface facing up, and the chamber 16 was closed. The distance between the inorganic substrate 17 and the silane coupling agent spray nozzle spray nozzle 15 was 10 mm. Next, instrumentation air was introduced at 20 L/min, and the inorganic substrate 17 was exposed to silane coupling agent vapor for 3 minutes to obtain a silane coupling agent-coated substrate.

Coating Example SC2

Figure 2:
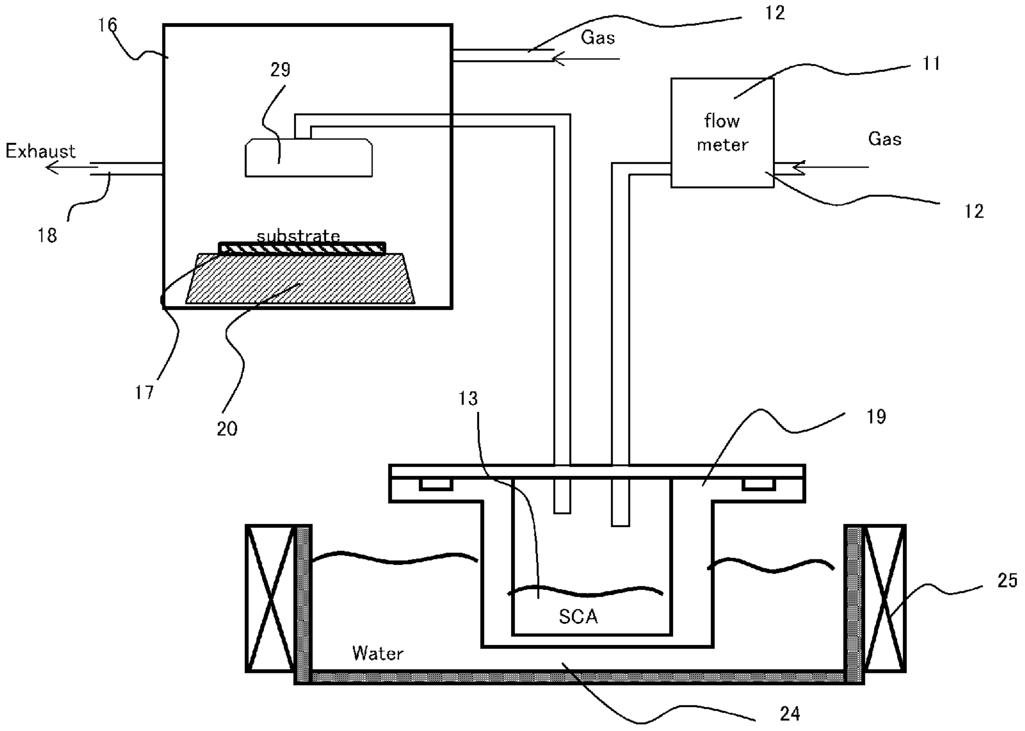
FIG. 2 is a schematic diagram illustrating an example of a silane coupling agent applying apparatus according to another embodiment of the present invention. The apparatus illustrated in FIG. 2 is equipped with a silane coupling agent spray nozzle and a water bath.

A suction bottle 19 filled with 100 parts by mass of silane coupling agent KBM-903 (Shin-Etsu Silicone, 3-aminopropyltrimethoxysilane) was connected to a chamber 16 equipped with an exhaust duct 18, a substrate cooling stage 20 and a silane coupling agent spray nozzle 15 via a silicone tube, and then the suction bottle 19 was left to still stand in a water bath 24 heated at 60° C. By sealing the suction bottle 19 in a state where instrumentation air could be introduced from above, a state was created in which the vapor of silane coupling agent could be introduced into the chamber 16 (FIG. 2). An inorganic substrate 17 was placed horizontally on the substrate cooling stage 20 with the UV irradiated surface facing up, and the chamber 16 was closed. The distance between the inorganic substrate and a silane coupling agent spray nozzle 29 was 5 mm. Next, instrumentation air was introduced at 20 L/min, and the inorganic substrate 17 was exposed to silane coupling agent vapor for 3 minutes to obtain a silane coupling agent-coated substrate.

Coating Example SC3

Figure 3:
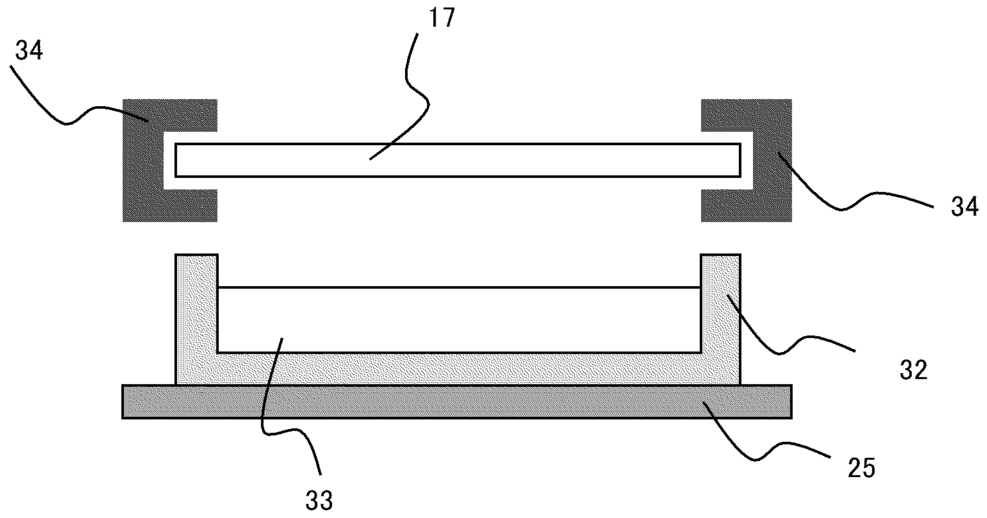
FIG. 3 is a schematic diagram illustrating an example of a silane coupling agent applying apparatus according to still another embodiment of the present invention. The apparatus illustrated in FIG. 3 is equipped with a metal bat.

As illustrated in FIG. 3, a metal bat 32 was filled with 100 parts by mass of silane coupling agent KBM-903 (Shin-Etsu Silicone, 3-aminopropyltrimethoxysilane), and heated to 60° C. using a heater 25. The inorganic substrate 17 was exposed to the generated silane coupling agent vapor for 5 minutes to obtain a silane coupling agent-coated substrate.

Coating Example SC4

Figure 4:
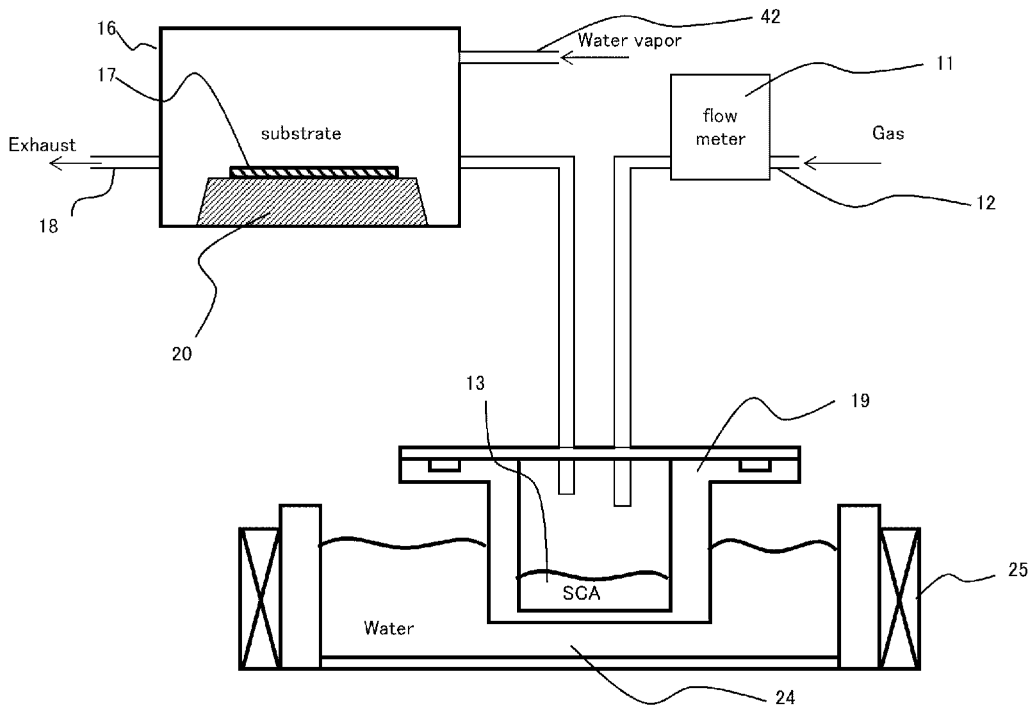
FIG. 4 is a schematic diagram illustrating an example of a silane coupling agent applying apparatus according to still another embodiment of the present invention. The apparatus illustrated in FIG. 4 is equipped with a silane coupling agent inlet and a water vapor inlet.

A suction bottle 19 filled with 100 parts by mass of silane coupling agent KBM-903 (Shin-Etsu Silicone, 3-aminopropyltrimethoxysilane) was connected to a chamber 16 equipped with an exhaust duct 18 and a substrate cooling stage 20 via a silicone tube, and then the suction bottle 19 was left to still stand in a water bath 24 heated at 50° C. By sealing the suction bottle 19 in a state where instrumentation air could be introduced from above, a state was created in which the vapor of silane coupling agent could be introduced into the chamber 16 (FIG. 4). An inorganic substrate 17 was placed horizontally on the substrate cooling stage 20 with the UV irradiated surface facing up, and the chamber was closed. The substrate temperature was 17° C., and the distance between the inorganic substrate and the silane coupling agent spray nozzle was 5 mm. was. Next, instrumentation air was introduced at 20 L/min, and the inorganic substrate 17 was exposed to silane coupling agent vapor for 3 minutes. Next, water vapor was introduced into the chamber from a water vapor inlet 42 for 2 minutes to obtain a silane coupling agent-coated substrate. Water vapor was introduced by connecting a suction bottle (not illustrated) filled with 100 parts by mass of pure water to the water vapor inlet via a silicone tube, warming the suction bottle in advance in a water bath heated at 60° C., and flowing instrumentation air from above the suction bottle as soon as the application of silane coupling agent was terminated.

It is preferable that the pure water is equivalent to or higher than GRADE1 according to the standards set forth by ISO3696-1987. The pure water is more preferably of GRADE3. The pure water used in the present invention was of GRADE1.

Coating Example SC5

The treatment was carried out in the same manner as in SC1 except that KBE-903 (Shin-Etsu Silicone, 3-aminopropyltriethoxysilane) was used instead of KBM-903.

Coating Example SC6

The treatment was carried out in the same manner as in SC1 except that KBM-603 (Shin-Etsu Silicone, N-2-(aminoethyl)-3-aminopropyltrimethoxysilane) was used instead of KBM-903.

Coating Example SC7

Figure 5:
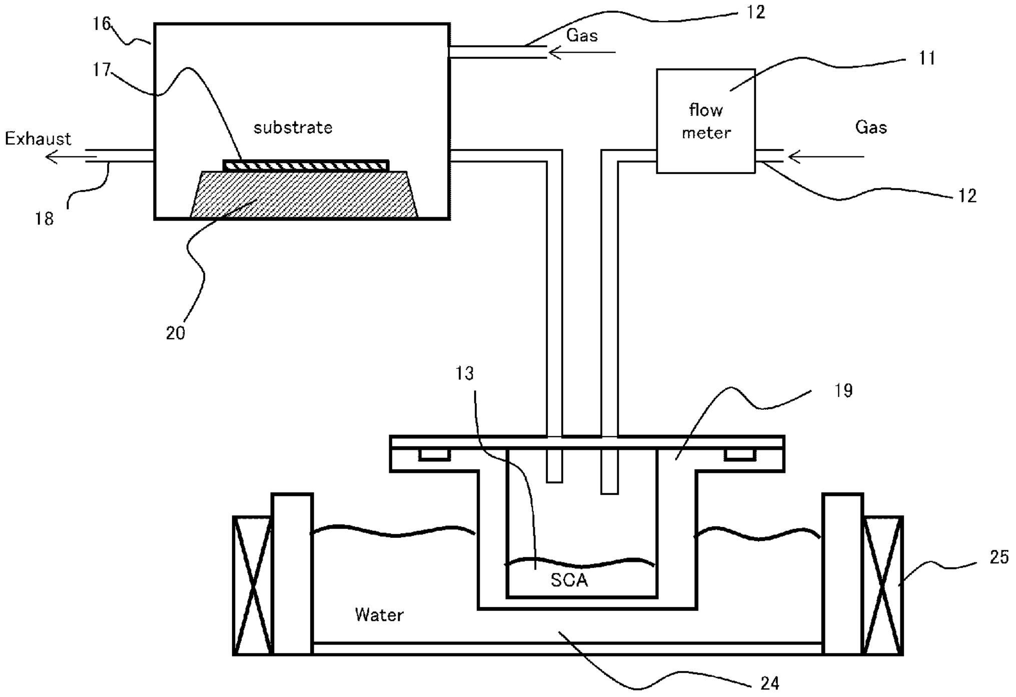
FIG. 5 is a schematic diagram illustrating an example of a silane coupling agent applying apparatus according to still another embodiment of the present invention. The apparatus illustrated in FIG. 5 is equipped with a silane coupling agent inlet.

A suction bottle 19 filled with 100 parts by mass of silane coupling agent KBM-903 (Shin-Etsu Silicone, 3-aminopropyltrimethoxysilane) was connected to a chamber 16 equipped with an exhaust duct 18 and a substrate cooling stage 20 via a silicone tube, and then the suction bottle 19 was left to still stand in a water bath 24 heated at 40° C. By sealing the suction bottle 19 in a state where instrumentation air could be introduced from above, a state was created in which the vapor of silane coupling agent could be introduced into the chamber 16 (FIG. 5). An inorganic substrate 17 was placed horizontally on the substrate cooling stage 20 with the UV irradiated surface facing up, and the chamber 16 was closed. The set temperature of the stage 20 was 17° C. Next, instrumentation air was introduced at 20 L/min, and the inorganic substrate 17 was exposed to silane coupling agent vapor for 3 minutes to obtain a silane coupling agent-coated substrate.

Coating Example SC8

The inorganic substrate was installed in a spin coater (MSC-500S manufactured by JAPAN CREATE Co., Ltd.), the rotation speed was increased up to 2000 rpm, and rotation was performed for 10 seconds to apply the undiluted solution of silane coupling agent (KBM-903), thereby obtaining a silane coupling agent-coated substrate.

Coating Example SC9

A diluted silane coupling agent solution was prepared by diluting the silane coupling agent (KBM-903) with isopropanol to a content of 1% by mass. The inorganic substrate was installed in a spin coater (MSC-500S, manufactured by JAPAN CREATE Co., Ltd.), the rotation speed was increased up to 2000 rpm, and rotation was performed for 10 seconds to apply the diluted silane coupling agent solution. Next, the substrate coated with a silane coupling agent was placed on a hot plate heated at 110° C. with the silane coupling agent-coated surface facing up, and heating was performed for about 1 minute to obtain a silane coupling agent-coated substrate.

<Fabrication of Laminate: Lamination>

The silane coupling agent-coated surface of the inorganic substrate and the heat-resistant polymer film were superimposed and pressurized for bonding. A laminator (MRK-1000 manufactured by MCK CO., LTD.) was used for bonding, and the bonding conditions were set to air source pressure: 0.7 MPa, temperature: 22° C., humidity: 55% RH, and lamination speed: 50 mm/sec. By heating the obtained inorganic substrate/silane coupling agent/heat-resistant polymer film laminate at 200° C. for 1 hour in the air, a laminate including an inorganic substrate, a silane coupling agent layer, and a heat-resistant polymer film in this order was obtained. Thereafter, a 90° peel test (F0) was conducted. Furthermore, a heat treatment was performed on a separately prepared laminate after the heat treatment (at 200° C. for 1 hour) at 350° C. for 500 hours in a nitrogen atmosphere, and a 90° peel test (F1) was conducted. The evaluation results are presented in Table 1.

<90° Peel Test (90° Peel Method)>

A 90° peel test was conducted using JSV-H1000 (manufactured by Japan Instrumentation System Co., Ltd.). The polymer film was peeled off from the base material at an angle of 90°, and the test (peeling) speed was 100 mm/min. The size of the measurement sample was 10 mm in width and 50 mm in length. The measurement was performed in an air atmosphere at room temperature (25° C.). The measurement was performed five times, and the average value of the peel strengths in five times of test was used as the measurement result.

<Long-Term Heat Resistance Test>

The sample (laminate) was stored for 500 hours in a state of being heated at 350° C. in a nitrogen atmosphere. A high-temperature inert gas oven INH-9N1 (manufactured by JTEKT THERMO SYSTEMS CORPORATION) was used for the heat treatment.

<Appearance After Long-Term Heat Resistance Test>

The laminate after the long-term heat resistance test was visually observed, and the number of bubbles, which had a diameter of 1 mm or more and did not contain any foreign matter to be a core, between the inorganic substrate and the heat-resistant polymer film was counted. The bubbles containing foreign matter to be a core were derived from foreign matter that was caught between the inorganic substrate and the heat-resistant polymer film during bonding, thus were not related to the uniformity of the reaction with the silane coupling agent, and were excluded from the evaluation. The presence or absence of foreign matter was examined using a magnifying glass and a microscope VH-Z100R (manufactured by KEYENCE CORPORATION). The appearance was evaluated as Favorable in a case where the number of bubbles, which had a diameter of 1 mm or more and did not contain any foreign matter to be a core, was 4 pieces/$m^2$ or more, and the appearance was evaluated as Poor in a case where the number of bubbles, which had a diameter of 1 mm or more and did not contain any foreign matter to be a core, was 5 pieces/$m^2$ or more.

<Evaluation of Silane Coupling Agent Layer Thickness>

A cross-sectional thin film sample of the laminate was fabricated using a focused ion beam (FIB) instrument, and the silane coupling agent layer thickness was determined through observation under a transmission electron microscope (TEM) (manufactured by JEOL Ltd.) at a magnification of 5000-fold. The measurement was performed at three points for a 10 cm length of the laminate, and the average value was used. In a case where the thickness of the silane coupling agent layer was uneven within one field of vision because of irregularities of the base material, the thickness at the thinnest part of the silane coupling agent layer was taken as the thickness.

<Evaluation of Base Material Surface Roughness>

The surface roughness (P-V value) of the base material was measured using a microscope (product name: OPTELICS HYBRID manufactured by Lasertec Corporation). The observation magnification was 50-fold, and the P-V value of the base material was measured from a 400 μm long cross-sectional profile, avoiding foreign matter and obvious defects. The evaluation was performed in one observation region for one sample.

<Observation of Peeled Off Surface>

The heat-resistant polymer film was peeled off from the laminate at 90°, and the inorganic substrate side was observed at a magnification of 5-fold using a microscope (product name: OPTELICS HYBRID manufactured by Lasertec Corporation) to examine the presence or absence of a sea-island structure. The inorganic substrate side and the heat-resistant polymer film side were analyzed by ESCA to evaluate whether the peeled off surface was the interface between the inorganic substrate and the silane coupling agent. K-Alpha$^+$ (manufactured by Thermo Fisher Scientific) was used as the instrument. The measurement conditions are as follows. At the time of analysis, the background was removed by the shirley method. The surface composition ratio was the average value of the measurement results at three or more places. In a case where a sea-island structure was observed on the inorganic substrate side, the measurement was performed at three or more places for each of the sea portion and island portion.

Measurement Conditions

Excited X-rays: Monochrome Al Kα rays

X-ray output: 12 kV, 6 mA

Photoelectron escape angle: 90°

Spot size: 400 μmφ

Path energy: 50 eV

Step: 0.1 eV

The image of the peeled off surface (inorganic substrate) observed at a magnification of 5-fold using a microscope (product name: OPTELICS HYBRID manufactured by Lasertec Corporation) was used to determine the area of peeled off part at the interface between the inorganic substrate and the silane coupling agent. The observation conditions were set to scan resolution: 0.33 μm, CCD mode: color, exposure time: standard, and light intensity of light source: 20%. The ESCA measurement results were used to judge which of the sea islands were due to peeling off at the interface between the inorganic substrate and the silane coupling agent, and the location where the elemental percentage of the inorganic substrate was 4% or more was judged to be the peeled off location at the interface between the inorganic substrate and the silane coupling agent. The acquired image was converted into 8 bit monochrome format using ImageJ, and the areas of the island portion and sea portion were determined at minimum display: 127, max display value: 128, and threshold: 44 and 124.

<Measurement of Silane Coupling Agent-Coated Surface by Infrared Microspectroscopy>

A silane coupling agent was applied to a KBr plate by the methods of SC1 to SC9, and the measurement by infrared microspectroscopy (transmission method) was performed. The silane coupling agent-coated substrate was placed in an aluminum bag immediately after coating, and stored in a state where nitrogen gas purging was performed until immediately before measurement. In a case where a spin coater was used, the KBr plate was temporarily fixed to a 10 cm×10 cm glass and coating was performed. The X-axis represented the wave number ($cm^{-1}$), and the Y-axis represented the absorbance (a.u.). The following processing was performed on the spectrum (hereinafter also referred to as raw data) acquired through the measurement by infrared microspectroscopy. The height of the peak (maximum value) attributed to the silane coupling agent (Si—O—Si) near 1030 $cm^{-1}$ was adjusted to 0.055 (a.u.), and the height of the valley (minimum value) near 840 $cm^{-1}$ was adjusted to 0.012 (a.u.) (hereinafter also referred to as processed data). By the following instrument, the spectrum of raw data can be easily converted into processed data. First, the spectrum of the acquired raw data was displayed at full scale in the range of 1070 $cm^{-1}$ to 800 $cm^{-1}$, and then the absorbance at the maximum value was adjusted to 0.055 (a.u.) and the absorbance at the minimum value was adjusted to 0.012 (a.u.) to acquire processed data. Regarding the acquired processed data, the value acquired by subtracting the area in the wave number range of 3000 $cm^{-1}$ to 2770 $cm^{-1}$ with base points of 3000 $cm^{-1}$ and 2770 $cm^{-1}$ corresponding to hydrocarbons from the area in the wave number range of 3400 $cm^{-1}$ to 2400 $cm^{-1}$ with base points of 3400 $cm^{-1}$ and 2400 $cm^{-1}$ corresponding to various functional groups (functional groups in general) was calculated as the peak area attributed to functional groups using analysis software.

The following instrument was used for measurement, spectrum processing, and analysis.

Instrument for measurement by infrared microspectroscopy (transmission method): Cary 670FTIR Agilent Technologies, Inc.

Peak height adjustment: Resolutions Pro attached to instrument for measurement by infrared microspectroscopy (transmission method)

Analysis software: Varian Resolutions Pro 4.0

Example 1

A silane coupling agent layer was formed using the SUS304 (base material thickness: 0.5 mm) as a base material by the method of SC1, and a laminate was fabricated using the heat-resistant polymer film F1 by the method of laminate fabrication example 1. The evaluation results are presented in Table 1.

Examples 2 to 17 and Comparative Examples 1 to 4

Examples 2 to 17 and Comparative Examples 1 to 4 were carried out under the conditions listed in Tables 1 and 2.

TABLE 1

| | Example 1 | Example 2 | Example 3 | Example 4 | Example 5 | Example 6 |
|---|---|---|---|---|---|---|
| Heat-resistant polymer film | F1 | F1 | F1 | F1 | F1 | F2 |
| Forming and applying method of adhesive layer | SC1 | SC1 | SC1 | SC1 | SC1 | SC1 |
| Adhesive layer (SCA amount) | KBM-903 | KBM-903 | KBM-903 | KBM-903 | KBM-903 | KBM-903 |
| Area of peeled off part at interface between inorganic substrate and silane coupling agent layer (%) | 7 | 8 | 9 | 10 | 9 | 5 |
| Silane coupling agent layer thickness (nm) | 410 | 380 | 410 | 350 | 380 | 370 |
| Base material | SUS | Inconel foil | Iron | Brass | SK steel | SUS |
| Base material thickness (mm) | 0.5 | 0.5 | 0.5 | 0.5 | 0.5 | 0.5 |
| Inorganic substrate (pasted surface) P-V value (μm) | 0.76 | 0.31 | 1.5 | 1.7 | 1.8 | 0.76 |
| F0 (N/cm) | 2.4 | 2.8 | 2.9 | 2.7 | 2.9 | 3.1 |
| F1 (N/cm) | 7 | 7 | 6 | 7 | 7 | 6.5 |
| Rate of increase in adhesive strength | 191.7 | 150.0 | 106.9 | 159.3 | 141.4 | 109.7 |
| Area of peak attributed to functional group | 7.7 | 8.2 | 7.5 | 7.6 | 8 | 8.1 |
| Appearance after long-term heating | Favorable | Favorable | Favorable | Favorable | Favorable | Favorable |

| | Example 7 | Example 8 | Example 9 | Example 10 | Example 11 |
|---|---|---|---|---|---|
| Heat-resistant polymer film | F3 | F4 | F1 | F1 | F1 |
| Forming and applying method of adhesive layer | SC1 | SC1 | SC2 | SC2 | SC2 |
| Adhesive layer (SCA amount) | KBM-903 | KBM-903 | KBM-903 | KBM-903 | KBM-903 |
| Area of peeled off part at interface between inorganic substrate and silane coupling agent layer (%) | 8 | 9 | 0 | 3 | 2 |
| Silane coupling agent layer thickness (nm) | 380 | 380 | 310 | 350 | 330 |
| Base material | SUS | SUS | SUS | Copper | Nickel-plated copper |
| Base material thickness (mm) | 0.5 | 0.5 | 0.5 | 0.5 | 0.5 |
| Inorganic substrate (pasted surface) P-V value (μm) | 0.76 | 0.76 | 0.76 | 15.2 | 1.4 |
| F0 (N/cm) | 3.5 | 4 | 3.4 | 2.4 | 2.8 |
| F1 (N/cm) | 7.7 | 7 | 8 | 6 | 6 |
| Rate of increase in adhesive strength | 120.0 | 75.0 | 135.3 | 150.0 | 114.3 |
| Area of peak attributed to functional group | 9.1 | 9.4 | 5.9 | 7.7 | 6.5 |
| Appearance after long-term heating | Favorable | Favorable | Favorable | Favorable | Favorable |

TABLE 2

| | Example 12 | Example 13 | Example 14 | Example 15 | Example 16 |
|---|---|---|---|---|---|
| Heat-resistant polymer film | F1 | F1 | F1 | F1 | F2 |
| Forming and applying method of adhesive layer | SC2 | SC2 | SC3 | SC4 | SC5 |
| Adhesive layer (SCA amount) | KBM-903 | KBM-903 | KBM-903 | KBM-903 | KBE-903 |
| Area of peeled off part at interface between inorganic substrate and silane coupling agent layer (%) | 3 | 1 | 15 | 11 | 7 |
| Silane coupling agent layer thickness (nm) | 460 | 330 | 250 | 230 | 350 |

TABLE 2-continued

| Base material | Nickel-plated iron | Rolled copper foil | SUS | SUS | SUS |
|---|---|---|---|---|---|
| Base material thickness (mm) | 0.5 | 0.06 | 0.5 | 0.5 | 0.5 |
| Inorganic substrate (pasted surface) P-V value (μm) | 1.8 | 3.04 | 0.76 | 0.76 | 0.76 |
| F0 (N/cm) | 2.2 | 2.8 | 2.4 | 2.1 | 2.3 |
| F1 (N/cm) | 7 | 5 | 5 | 5 | 6 |
| Rate of increase in adhesive strength | 218.2 | 78.6 | 108.3 | 138.1 | 160.9 |
| Area of peak attributed to functional group | 7.2 | 8.3 | 9.9 | 7.2 | 9.8 |
| Appearance after long-term heating | Favorable | Favorable | Favorable | Favorable | Favorable |

| | Example 17 | Comparative Example 1 | Comparative Example 2 | Comparative Example 3 | Comparative Example 4 |
|---|---|---|---|---|---|
| Heat-resistant polymer film | F2 | F3 | F4 | F4 | F4 |
| Forming and applying method of adhesive layer | SC6 | SC7 | SC8 | SC9 | SC7 |
| Adhesive layer (SCA amount) | KBM-603 | KBM-903 | KBM-903 (undiluted solution) | KBM-903 (IPA) | KBM-903 |
| Area of peeled off part at interface between inorganic substrate and silane coupling agent layer (%) | 8 | 61 | 77 | 34 | 18 |
| Silane coupling agent layer thickness (nm) | 350 | 32 | 48 | 68 | 20 |
| Base material | SUS | SUS | Copper | SUS | SUS |
| Base material thickness (mm) | 0.5 | 0.5 | 0.5 | 0.5 | 0.5 |
| Inorganic substrate (pasted surface) P-V value (μm) | 0.76 | 0.76 | 51.2 | 0.76 | 0.76 |
| F0 (N/cm) | 2.2 | 1.5 | 0.3 | 1.5 | 0.1 |
| F1 (N/cm) | 6.5 | 2.7 | Peeled off | 2 | Peeled off |
| Rate of increase in adhesive strength | 195.5 | 80.0 | — | 33.3 | — |
| Area of peak attributed to functional group | 9.9 | 27 | 25 | 21 | 27 |
| Appearance after long-term heating | Favorable | Poor | Poor | Poor (partially peeled off) | Peeled off |

INDUSTRIAL APPLICABILITY

By using the laminate of the present invention, it is possible to ease the processing conditions (expand the process window) and increase the service life of probe cards, flat cables, and the like as well as (insulated type) heaters, electrical or electronic substrates, back sheets for solar cells, and the like. Furthermore, a roll-shaped laminate is easy to transport and store.

DESCRIPTION OF REFERENCE SIGNS

11 Flow meter
12 Gas inlet
13 Chemical tank (silane coupling agent tank)
15 Silane coupling agent spray nozzle
16 Processing chamber (chamber)
17 Inorganic substrate
18 Exhaust port (exhaust duct)
19 Suction bottle
20 Substrate cooling stage
24 Water bath
25 Heater
29 Silane coupling agent spray nozzle
32 Metal bat
33 Silane coupling agent
34 Substrate holder
42 Water vapor inlet
50 Ultrasonication bath

The invention claimed is:

1. A laminate comprising an inorganic substrate, a silane coupling agent layer, and a heat-resistant polymer film in this order, wherein the inorganic substrate does not include copper, wherein the heat-resistant polymer film is a polyimide film obtained by causing a dehydration ring-closure reaction of a polyamic acid which is obtained by a reaction between a diamine and a tetracarboxylic acid, and wherein the following (A) to (E) are satisfied:

(A) a peel strength F0 when the heat-resistant polymer film is peeled off from the inorganic substrate at 90° is 1.0 N/cm or more and 20 N/cm or less;

(B) an area of a peeled off part at an interface between the inorganic substrate and the silane coupling agent layer is 20% or less of an entire peeled off surface on an inorganic substrate surface after the heat-resistant polymer film has been peeled off from the inorganic substrate at 90°;

(C) a peel strength F1 when the heat-resistant polymer film is peeled off from the inorganic substrate at 90° after the laminate has been heated at 350° C. for 500 hours in a nitrogen atmosphere is greater than the F0;

(D) a surface roughness (P-V value) of the inorganic substrate is 0.1 μm or more and 20 μm or less; and (E) a thickness of the silane coupling agent layer of the laminate is 0.05 times or more the surface roughness (P-V value) of the inorganic substrate.

2. The laminate according to claim 1, wherein a thickness of the silane coupling agent layer of the laminate is 0.1 times or more the surface roughness (P-V value) of the inorganic substrate.

3. The laminate according to claim 1, wherein the inorganic substrate contains a 3d metal element.

4. The laminate according to claim 1, wherein the inorganic substrate is one or more selected from the group consisting of SUS, iron, and nickel.

5. A probe card comprising the laminate according to claim 1 as a constituent member.

6. A flat cable comprising the laminate according to claim 1 as a constituent member.

7. A heating unit comprising the laminate according to claim 1 as a constituent member.

8. An electrical or electronic substrate comprising the laminate according to claim 1 as a constituent member.

9. A solar cell comprising the laminate according to claim 1 as a constituent member.

10. A method for manufacturing a laminate including an inorganic substrate, a silane coupling agent layer, and a heat-resistant polymer film in this order, the method comprising:

(1) a step of applying a silane coupling agent to at least one surface of an inorganic substrate;

(2) a step of superimposing a heat-resistant polymer film on the silane coupling agent-coated surface of the inorganic substrate; and (3) a step of pressurizing the inorganic substrate and heat-resistant polymer film, wherein the heat-resistant polymer film is a polyimide film obtained by causing a dehydration ring-closure reaction of a polyamic acid which is obtained by a reaction between a diamine and a tetracarboxylic acid, a surface roughness (P-V value) of the inorganic substrate is 0.1 μm or more and 20 μm or less, a thickness of the silane coupling agent layer of the laminate is 0.05 times or more the surface roughness (P-V value) of the inorganic substrate, an area of a peak attributed to a functional group is 15 or less in a spectrum acquired by applying the silane coupling agent to a KBr plate by the same coating method as in step (1) to fabricate a coated plate and measuring the coated plate by infrared microspectroscopy, and the area of the peak attributed to a functional group is the value acquired by subtracting the area in the wave number range of 3000 $cm^{-1}$ to 2770 $cm^{-1}$ with base points of 3000 $cm^{-1}$ and 2770 $cm^{-1}$ from the area in the wave number range of 3400 $cm^{-1}$ to 2400 $cm^{-1}$ with base points of 3400 $cm^{-1}$ and 2400 $cm^{-1}$.

11. The laminate according to claim 2, wherein the inorganic substrate contains a 3d metal element.

12. The laminate according to claim 2, wherein the inorganic substrate is one or more selected from the group consisting of SUS, iron, and nickel.

13. A probe card comprising the laminate according to claim 2 as a constituent member.

14. A flat cable comprising the laminate according to claim 2 as a constituent member.

15. A heating unit comprising the laminate according to claim 2 as a constituent member.

16. An electrical or electronic substrate comprising the laminate according to claim 2 as a constituent member.

17. A solar cell comprising the laminate according to claim 2 as a constituent member.

* * * * *